(12) United States Patent
Knoebel et al.

(10) Patent No.: US 9,127,603 B2
(45) Date of Patent: Sep. 8, 2015

(54) DECELERATION FUEL CUTOFF CONTROL SYSTEMS AND METHODS

(76) Inventors: Ronald W. Knoebel, Waterford, MI (US); Krishnendu Kar, South Lyon, MI (US); Ryan Goode, Howell, MI (US)

(*) Notice: Subject to any disclaimer, the term of this patent is extended or adjusted under 35 U.S.C. 154(b) by 800 days.

(21) Appl. No.: 13/358,810

(22) Filed: Jan. 26, 2012

(65) Prior Publication Data
US 2013/0080031 A1    Mar. 28, 2013

Related U.S. Application Data

(60) Provisional application No. 61/537,719, filed on Sep. 22, 2011.

(51) Int. Cl.
F02D 41/12    (2006.01)
F02D 41/00    (2006.01)

(52) U.S. Cl.
CPC .......... *F02D 41/0005* (2013.01); *F02D 41/123* (2013.01); *F02D 2200/021* (2013.01); *F02D 2200/501* (2013.01); *F02D 2200/602* (2013.01); *Y02T 10/42* (2013.01)

(58) Field of Classification Search
CPC ............ F02D 41/123; F02D 2200/602; F02D 2200/1012; F02N 11/0818; F02N 11/0822
USPC ................. 123/320, 325, 332, 371, 436, 493; 701/103, 104, 110, 112; 73/114.25
See application file for complete search history.

(56) References Cited

U.S. PATENT DOCUMENTS

| | | | | |
|---|---|---|---|---|
| 4,539,643 A * | 9/1985 | Suzuki et al. | ................. | 701/112 |
| 5,016,181 A * | 5/1991 | Hayashida | ..................... | 701/112 |
| 5,520,594 A * | 5/1996 | Fukasawa et al. | ............. | 477/173 |
| 7,089,103 B2 * | 8/2006 | Katakura et al. | ................ | 701/54 |
| 7,220,213 B2 * | 5/2007 | Shimada et al. | ................ | 477/73 |
| 7,285,073 B2 * | 10/2007 | Iriyama | ......................... | 477/110 |
| 7,614,212 B2 * | 11/2009 | Sakai | .............................. | 60/285 |
| 8,321,121 B2 * | 11/2012 | Santou et al. | ................. | 701/104 |
| 8,764,606 B2 * | 7/2014 | Weaver et al. | .................. | 477/77 |
| 2012/0089309 A1 * | 4/2012 | Kim et al. | ........................ | 701/58 |
| 2014/0257652 A1 * | 9/2014 | Oki et al. | ......................... | 701/54 |

OTHER PUBLICATIONS

"Driveline release coordination with negative crankshaft torque", Research Disclosure Journal, Database No. 562059, Published Feb. 2011: 2 pages.

* cited by examiner

*Primary Examiner* — Thomas Moulis
*Assistant Examiner* — Elizabeth Hadley

(57) ABSTRACT

A system for a vehicle includes a rate of change module, a period estimation module, a deceleration fuel cutoff (DFCO) module, and an injection control module. The rate of change module determines a rate of change of an engine speed. While an engine is being fueled, the period estimation module determines an estimated period of a next DFCO event based on the rate of change of the engine speed. The DFCO control module selectively generates a DFCO signal based on the estimated period. The injection control module cuts off fuel to the engine when the DFCO signal is generated.

20 Claims, 6 Drawing Sheets

DECELERATION FUEL CUTOFF CONTROL SYSTEMS AND METHODS

CROSS-REFERENCE TO RELATED APPLICATIONS

This application claims the benefit of U.S. Provisional Application No. 61/537,719, filed on Sep. 22, 2011. The disclosure of the above application is incorporated herein by reference in its entirety.

FIELD

The present disclosure relates to internal combustion engines and more particularly to deceleration fuel cutoff control systems and methods for engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

Traditional engine control systems control engine output torque using air flow in spark-ignition engines and using fuel flow in compression-ignition engines. When one or more faults are diagnosed, traditional engine control systems transition to engine shutdown. For example only, traditional engine control systems may disable fuel to the engine and prevent airflow into the engine.

SUMMARY

A system for a vehicle includes a rate of change module, a period estimation module, a deceleration fuel cutoff (DFCO) module, and an injection control module. The rate of change module determines a rate of change of an engine speed. While an engine is being fueled, the period estimation module determines an estimated period of a next DFCO event based on the rate of change of the engine speed. The DFCO control module selectively generates a DFCO signal based on the estimated period. The injection control module cuts off fuel to the engine when the DFCO signal is generated.

A method for a vehicle, includes: determining a rate of change of an engine speed; while an engine is being fueled, determining an estimated period of a next deceleration fuel cutoff (DFCO) event based on the rate of change of the engine speed; and selectively generating a DFCO signal based on the estimated period; and cutting off fuel to the engine when the DFCO signal is generated.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine control module (ECM) controls torque output by an internal combustion engine of a vehicle. In some circumstances, the ECM may disable fuel to cylinders of the engine while the vehicle is running (e.g., key ON), such as during a vehicle deceleration event. Cutting off fuel to the engine during a vehicle deceleration event may be referred to as a deceleration fuel cutoff (DFCO) event.

Generally, the ECM may initiate a DFCO event and cut off fuel to the engine when an engine speed is greater than a predetermined minimum entry speed (e.g., approximately 1500 revolutions per minute) and one or more other DFCO entry conditions are satisfied. Under some circumstances, however, fuel could be cut off during vehicle deceleration when the one or more other DFCO entry conditions are satisfied and the engine speed is not greater than the predetermined minimum entry speed.

For example only, when the vehicle begins traveling down a decline (e.g., a hill), the engine speed may not be greater than the predetermined minimum entry speed. As the vehicle travels down the decline, however, the engine speed may increase and become greater than the predetermined minimum entry speed. The ECM could then initiate a DFCO event and cut off fuel to the engine if the one or more other entry conditions are satisfied. However, fuel may be unnecessarily consumed as the engine speed increases while the vehicle travels down the decline.

The ECM of the present disclosure generates an estimated period of a next DFCO event based on a rate of change of the engine speed. The estimated period corresponds to a potential duration (e.g., in seconds) of the next DFCO event. Instead of selectively initiating a DFCO event when the engine speed is greater than the predetermined minimum entry speed, the ECM selectively initiates a DFCO event based on the estimated period. Relative to initiating a DFCO event when the engine speed is greater than the predetermined minimum entry speed, selectively initiating a DFCO event based on the estimated period may enable fuel to be cut off sooner and provide fuel consumption savings under some circumstances.

Figure 1:
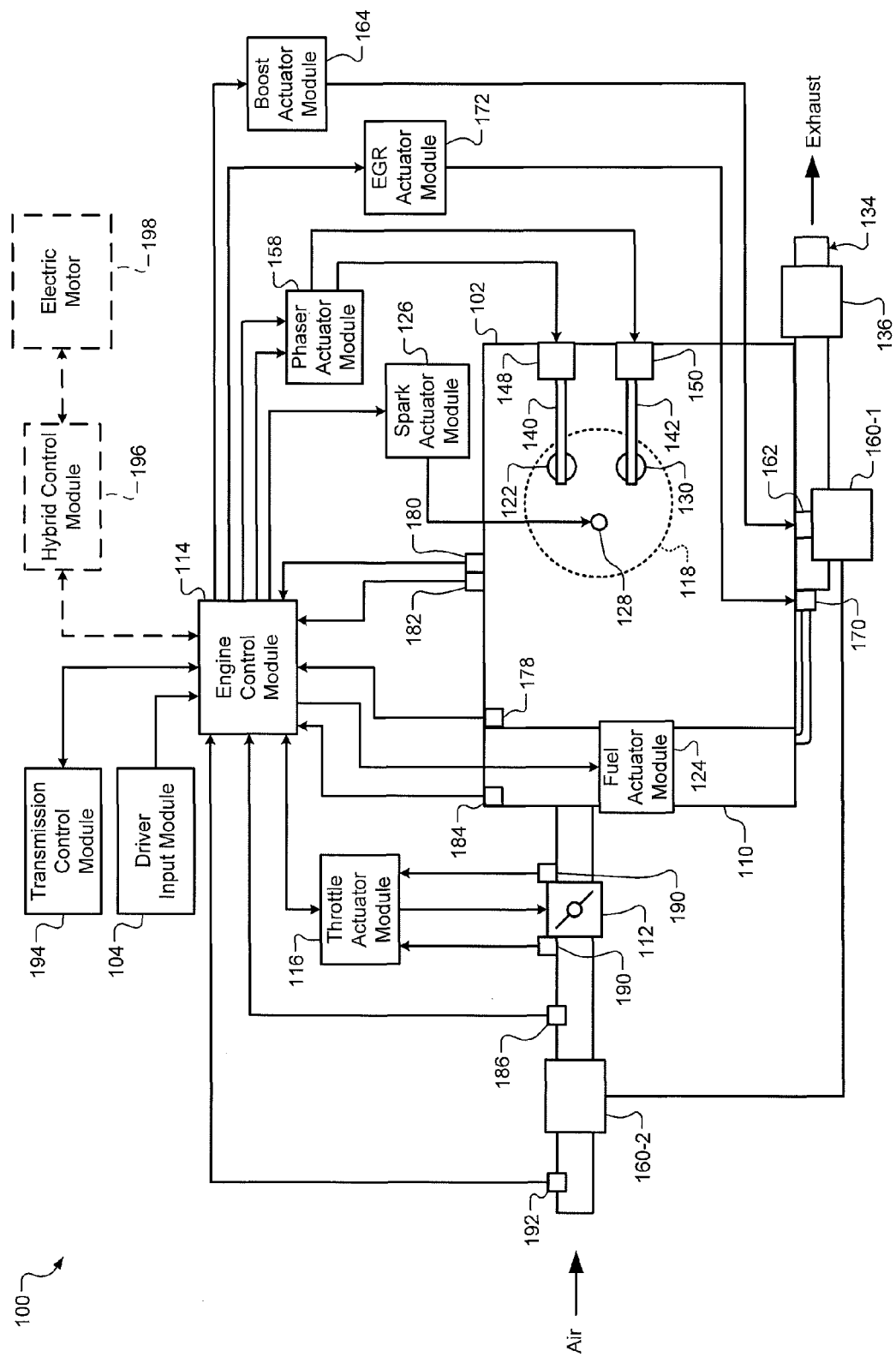
FIG. 1 includes a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air may be drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes only, a single representative cylinder 118 is shown. For example only, the engine 102 may include 2, 3, 4, 5, 6, 8, 10, and/or 12 cylinders.

The engine 102 may operate using a four-stroke cylinder cycle or another suitable operating cycle. The four strokes, described below, may be named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders.

The injected fuel mixes with air and creates an air/fuel mixture in the cylinder 118. During the compression stroke, a piston (not shown) within the cylinder 118 compresses the air/fuel mixture. Based on a signal from the ECM 114, a spark actuator module 126 may energize a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark in a cylinder may be referred to as a firing event.

The spark actuator module 126 may have the ability to vary the timing of the spark for each firing event. In addition, the spark actuator module 126 may have the ability to vary the timing of the spark for a given firing event even when a change in the timing signal is received after the firing event immediately before the given firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134. A catalyst 136 receives exhaust gas output by the engine 102 and reacts with various components of the exhaust gas. For example only, the catalyst may include a three-way catalyst (TWC) or another suitable exhaust catalyst.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. Enablement and disablement of opening of the intake valve 122 and/or the exhaust valve 130 may be regulated in some types of engine systems. Lift and/or duration of opening of the intake valve 122 and/or the exhaust valve 130 may also be regulated in some types of engine systems.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

Opening of a wastegate 162 may be controlled to control an amount of exhaust gas allowed to bypass the turbine 160-1. Exhaust gas bypassing the turbine 160-1 may reduce the boost (the amount of intake air compression) of the turbocharger. The ECM 114 may control the turbocharger via a boost actuator module 164. The boost actuator module 164 may modulate the boost of the turbocharger by controlling the opening of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also absorb heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the rotational speed of the crankshaft (i.e., engine speed) in revolutions per minute (RPM) using a crankshaft position sensor 178. The rotational speed of the crankshaft may be referred to as engine speed. Temperature of engine oil may be measured using an oil temperature (OT) sensor 180. Temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flowrate (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from one or more of the sensors to make control decisions for the engine system 100.

The ECM 114 may communicate with a transmission control module 194 to coordinate operation of the engine 102 and a transmission (not shown). For example only, the ECM 114 and the transmission control module 194 may communicate to coordinate shifting gears (and more specifically gear ratio) in the transmission. The ECM 114 may, for example, adjust engine output torque during a gear shift. The ECM 114 may communicate with a hybrid control module 196, for example, to coordinate operation of the engine 102 and an electric motor 198.

The electric motor 198 may also function as a generator and may be used to produce electrical energy for use by vehicle electrical systems and/or for storage in an energy storage device (e.g., a battery). The production of electrical energy may be referred to as regenerative braking. The electric motor 198 may apply a braking (i.e., negative) torque on the engine 102 to perform regenerative braking and produce electrical energy. The engine system 100 may also include one or more additional electric motors. In various implementations, various functions of the ECM 114, the transmission control module 194, and the hybrid control module 196 may be integrated into one or more modules.

Each system that varies an engine parameter may be referred to as an engine actuator. Each engine actuator receives an associated actuator value. For example, the throttle actuator module 116 may be referred to as an engine actuator and the throttle opening area may be referred to as the associated actuator value. In the example of FIG. 1, the throttle actuator module 116 achieves the throttle opening area by adjusting an angle of the blade of the throttle valve 112.

The spark actuator module 126 may similarly be referred to as an engine actuator, while the associated actuator value may be the amount of spark advance relative to cylinder TDC. Other actuators may include the cylinder actuator module, the fuel actuator module 124, the phaser actuator module 158, the boost actuator module 164, and the EGR actuator module 172. For these engine actuators, the associated actuator values may include to number of activated cylinders, fueling rate, intake and exhaust cam phaser angles, boost pressure, and EGR valve opening area, respectively. The ECM 114 may control actuator values in order to cause the engine 102 to achieve a target engine output torque.

Figure 2:
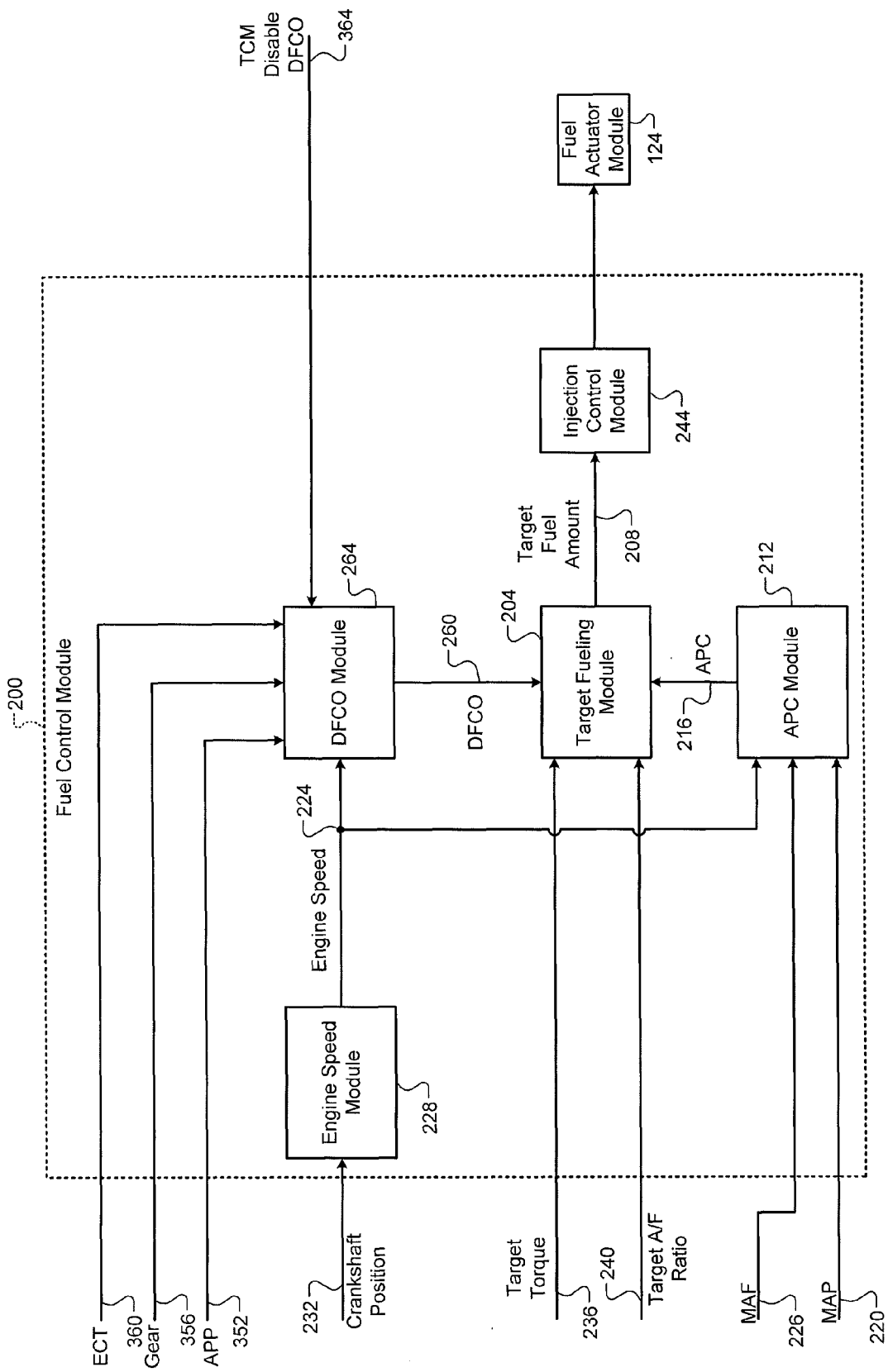
FIG. 2 includes a functional block diagram of an example fuel control module according to the present disclosure.

Referring now to FIG. 2, a functional block diagram of an example implementation of a fuel control module 200 of the ECM 114 is presented. A target fueling module 204 determines a target amount (e.g., mass) of fuel to be injected for a combustion event that will occur within a cylinder of the engine 102. The target amount of fuel to be injected for the combustion event will be referred to as a target fuel amount 208. The target fueling module 204 may determine the target fuel amount 208 for each combustion event of the engine 102.

An air per cylinder (APC) determination module 212 may determine an amount (e.g., mass) of air that will be present for the combustion event of the cylinder. The amount of air that will be present for the combustion event of the cylinder will be referred to as an APC 216. The APC module 212 may determine the APC 216 for each combustion event of the engine 102.

The APC module 212 may determine the APC 216, for example, based on a MAP 220 measured using the MAP sensor 184, an engine speed 224, and/or one or more other suitable parameters. In various implementations, the APC module 212 may determine the APC 216 based on a MAF 226 measured using the MAF sensor 186. In other implementations, the APC 216 may be a commanded APC and may be determined, for example, based on one or more driver inputs (e.g., accelerator pedal position).

An engine speed module 228 may determine the engine speed 224 based on a crankshaft position 232 measured using the crankshaft position sensor 178. For example only, the engine speed module 228 may determine the engine speed 224 based on a change in the crankshaft position 232 over a period.

The target fueling module 204 may generate the target fuel amount 208 for the combustion event, for example, to achieve a target torque 236 and/or a target air/fuel ratio 240 with the APC 216 of the combustion event. The target torque 236 may be set, for example, based on one or more driver inputs, such as an accelerator pedal position. The target air/fuel ratio 240 may be set, for example, based on a stoichiometric air/fuel ratio or another suitable air/fuel ratio. The target fueling module 204 may generate the target fuel amount 208 for the combustion event, for example, as a function of the target torque 236, the target air/fuel ratio 240, the APC 216, and/or one or more other suitable parameters. An injector control module 244 may command the fuel actuator module 124 to selectively control fuel injection for the combustion events of the engine 102 based on the target fuel amount 208.

The target fueling module 204 also generates the target fuel amount 208 based on a state of a deceleration fuel cutoff (DFCO) signal 260. A DFCO module 264 (see also FIG. 3) sets the DFCO signal 260 to one of an active state and an inactive state at a given time.

Fueling to the cylinders of the engine 102 is cut off when the DFCO signal 260 is in the active state. Fueling to the cylinders of the engine 102 may be controlled as described above or in another suitable manner when the DFCO signal 260 is in an inactive state. For example only, the target fueling module 204 may set the target fuel amount 208 to zero (such that no fuel will be injected) when the DFCO signal 260 is in the active state. In this manner, fuel may be cut off to the cylinders of the engine 102 when the DFCO signal 260 is in the active state. A spark control module (not shown) may disable spark to the cylinders of the engine 102 when the DFCO signal 260 is in the active state.

The DFCO module 264 could selectively transition the DFCO signal 260 from the inactive state to the active state when the engine speed 224 is greater than a predetermined minimum entry speed (e.g., approximately 1500 RPM) and one or more other DFCO entry conditions are satisfied. Under some circumstances, however, fuel could be cut off during vehicle deceleration when the one or more other DFCO entry conditions are satisfied and the engine speed 224 is not greater than the predetermined minimum entry speed.

For example only, when the vehicle begins traveling down a decline (e.g., a hill), the engine speed 224 may not be greater than the predetermined minimum entry speed. As the vehicle travels down the decline, the engine speed 224 may increase and become greater than the predetermined minimum entry speed. Fuel could then be cut off if the one or more other entry conditions are satisfied. However, fuel may be unnecessarily consumed as the engine speed 224 increases while the vehicle travels down the decline.

For another example only, as the vehicle travels down the decline, the engine speed 223 may not be greater than the predetermined minimum entry speed and the engine speed 224 may not increase. As the engine speed 224 may fail to be greater than the predetermined minimum entry speed while the vehicle travels down the decline, fuel may not be cut off.

The DFCO module 264 of the present disclosure generates an estimated period of a DFCO event based on a rate of change of the engine speed 224. Instead of selectively transitioning the DFCO signal 260 to the active state based on the comparison of the engine speed 224 and the predetermined minimum entry speed, the DFCO module 264 selectively transitions the DFCO signal 260 to the active state based on the estimated period. Relative to transitioning based on the comparison of the engine speed 224 and the predetermined minimum entry speed, selectively transitioning the DFCO signal 260 to the active state based on the estimated period may enable fuel to be cut off sooner and provide fuel consumption savings under some circumstances.

Figure 3:
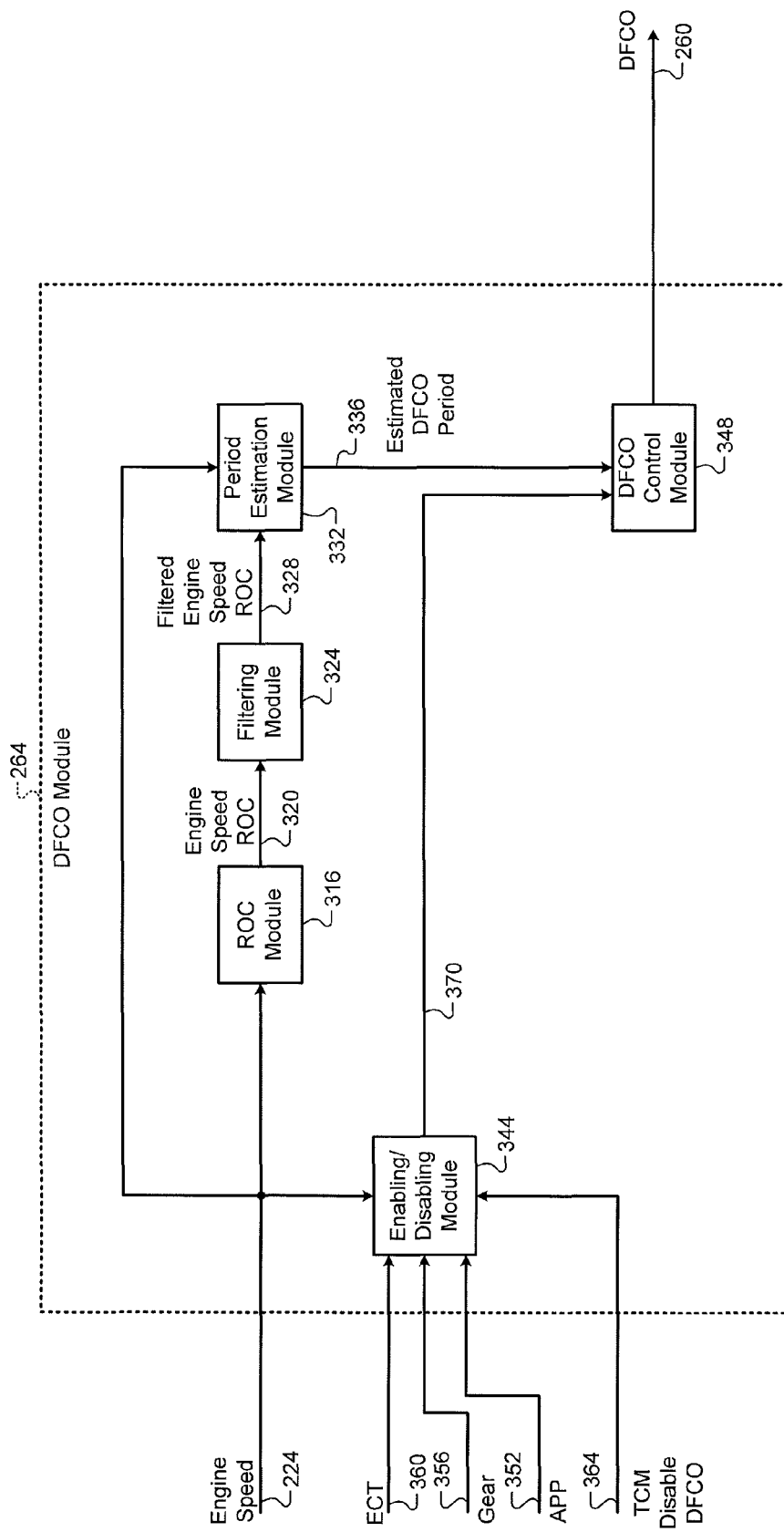
FIG. 3 includes a functional block diagram of an example deceleration fuel cutoff (DFCO) module according to the present disclosure.

Referring now to FIG. 3, a functional block diagram of an example implementation of the DFCO module 264 is presented. A first rate of change (ROC) module 316 determines an engine speed ROC 320 based on the engine speed 224. The engine speed ROC 320 corresponds a rate of change of the engine speed 224 over a predetermined period. The engine speed ROC 320 may be determined, for example, based on a mathematical derivative of the engine speed 224 or in another suitable manner.

A filtering module 324 may apply a filter to the engine speed ROC 320 to generate a filtered engine speed ROC 328. For example only, the filtering module 324 may determine a moving average the engine speed ROC 320 over a predetermined period or apply another suitable type of filter to generate the filtered engine speed ROC 328. The predetermined period may be, for example, approximately 1 second or another suitable period. The moving average may be weighted or non-weighted. The filtering module 324 may also generate the filtering engine speed ROC 328 based on a state of a torque converter clutch (e.g., locked, controlled slip, etc.). For example only, the filtering module 324 may vary a filtering coefficient based on the state of the torque converter clutch.

A period estimation module 332 generates an estimated DFCO period 336 based on the engine speed ROC 320. The estimated DFCO period 336 may refer to an estimated period (e.g., seconds) from the present time that fuel could be cut off to the cylinders of the engine 102 before fueling to the cylinders would be re-enabled. In other words, the estimated DFCO period 336 may refer to an estimated period (duration) of a next DFCO event.

The period estimation module 332 may generate the estimated DFCO period 336 based on the filtered engine speed ROC 328, the engine speed 224, and a first predetermined (minimum) engine speed. The period estimation module 332 may generate the estimated DFCO period 336 using one of a function and a mapping that relates the filtered engine speed ROC 328, the engine speed 224, and the first predetermined engine speed to the estimated DFCO period 336. For example only, the period estimation module 332 may generate the estimated DFCO period 336 using the equation:

$$T = \frac{\text{Engine Speed} - \text{Pred Engine Speed}}{\text{Filtered Engine Speed } ROC},$$

where T is the estimated DFCO period 336, Engine Speed is the engine speed 224, Pred Engine Speed is the first predetermined engine speed, and Filtered Engine Speed ROC is the filtered engine speed ROC 328. The first predetermined engine speed may be a fixed value or a variable value. For example only, if the first predetermined engine speed is a variable value, the first predetermined engine speed may be set at a given time based on a state of the torque converter clutch (e.g., locked, controlled slip, etc.), a state of the vehicle, and/or one or more other suitable parameters. The first predetermined engine speed is greater than an idle engine speed. In various implementations, the engine speed ROC 320 may be used in place of the filtered engine speed ROC 328. As the denominator of the above equation approaches zero, the estimated DFCO period 336 approaches infinity. The estimated DFCO period 336 may be limited to a predetermined maximum value.

An enabling/disabling module 344 selectively enables and disables a DFCO control module 348. When enabled, the DFCO control module 348 determines whether to set the DFCO signal 260 to one of the active state and the inactive state based on the estimated DFCO period 336. For example only, the DFCO control module 348 may set the DFCO signal 260 to the active state when the estimated DFCO period 336 is greater than a predetermined minimum DFCO period. As stated above, fueling to the engine 102 is cut off when the DFCO signal 260 is in the active state.

Conversely, the DFCO control module 348 may set the DFCO signal 260 to the inactive state when the estimated DFCO period 336 is less than the predetermined minimum DFCO period. For example only the predetermined minimum DFCO period may be approximately 2 seconds or another suitable minimum period of a DFCO event (during which fuel is cut off to the engine 102). When disabled, the DFCO signal 260 is set to the inactive state, thereby preventing the DFCO control module 348 from initiating a DFCO event.

The enabling/disabling module 344 selectively enables and disables the DFCO control module 348 based on an accelerator pedal position (APP) 352 and a gear ratio 356. The enabling/disabling module 344 selectively enables and disables the DFCO control module 348 further based on an engine coolant temperature (ECT) 360 and a transmission control module (TCM) disable DFCO signal 364.

For example only, the enabling/disabling module 344 may disable the DFCO control module 348 when at least one of the following is true:
  (i) the APP 352 is greater than a predetermined resting APP;
  (ii) the gear ratio 356 is less than a predetermined ratio;
  (iii) the ECT 360 is less than a predetermined temperature;
  (iv) the engine speed 224 is less than a second predetermined (minimum) engine speed; and
  (v) the TCM disable DFCO signal 364 is in an active state.
Conversely, the enabling/disabling module may enable the DFCO control module 348 when (i)-(v) are not satisfied.

The APP 352 may be measured using one or more accelerator pedal position sensors (not shown). When the accelerator pedal is not being depressed, the APP 352 may be equal to the predetermined resting APP. The APP 352 may increase relative to the predetermined resting APP as the accelerator pedal is depressed. The gear ratio 356 may correspond to a gear ratio currently engaged within the transmission and may be determined, for example, by the transmission control module 194. The predetermined ratio may be, for example, a third gear ratio, a fourth gear ratio, a fifth gear ratio, or another suitable gear ratio. The ECT 360 may be measured using the ECT sensor 182. The predetermined temperature may be, for example, between approximately 30 degrees Celsius (° C.) and approximately 60° C. or another suitable temperature. The second predetermined engine speed may be, for example, approximately 900-1100 RPM or another suitable engine speed that is greater than the idle engine speed. The transmission control module 194 sets the TCM disable DFCO signal 364 to one of the active state and an inactive state at a given time based on a second estimated DFCO period as discussed further below.

The enabling/disabling module 344 may enable and disable the DFCO control module 348, for example, using an enable/disable signal 370. For example, the enabling/disabling module 344 may set the enable/disable signal 370 to the inactive state to enable the DFCO control module 348. Conversely, the enabling/disabling module 344 may set the enable/disable signal 370 to the active state to disable the DFCO control module 348.

Figure 4:
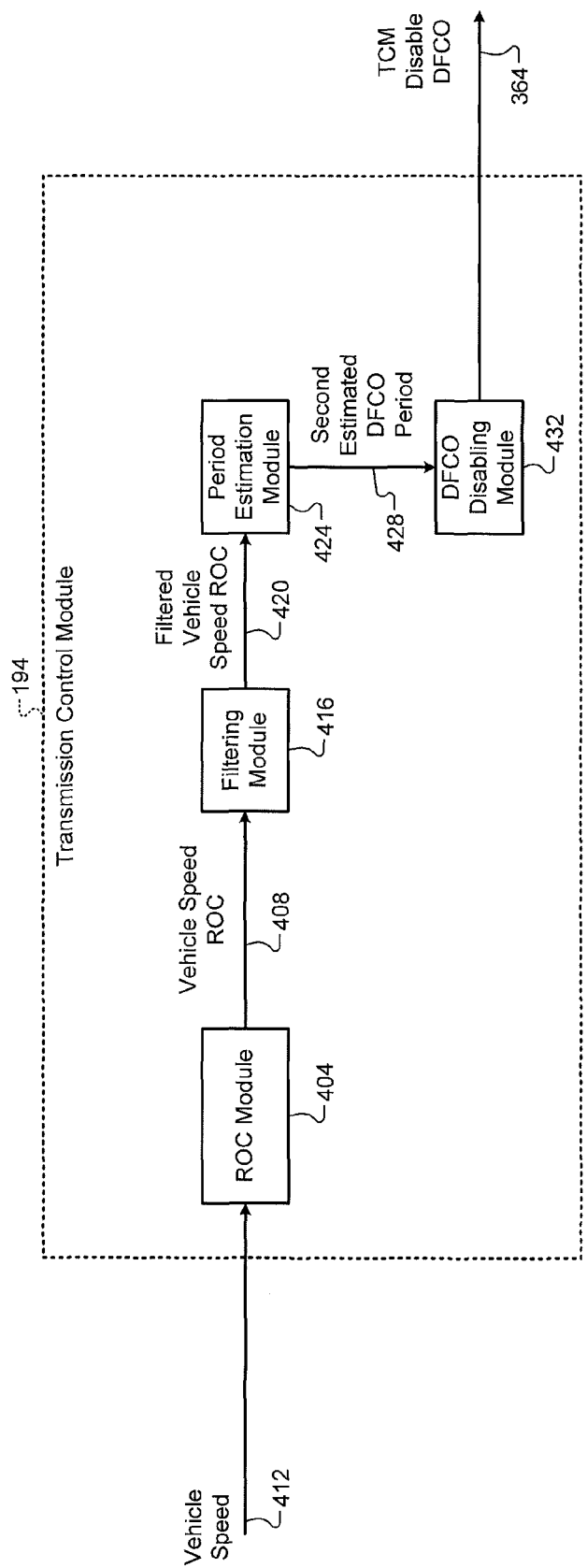
FIG. 4 includes a functional block diagram of an example transmission control module according to the present disclosure.

Referring now to FIG. 4, a functional block diagram of an example implementation of the transmission control module 194 is presented. A second ROC (rate of change) module 404 determines a vehicle speed ROC 408 based on a vehicle speed 412. The vehicle speed ROC 408 corresponds a rate of change of the vehicle speed 412 over a predetermined period. The vehicle speed ROC 408 may be determined, for example, based on a mathematical derivative of the vehicle speed 412 or in another suitable manner. The vehicle speed 412 may be determined, for example, based on one or more wheel speeds generated based on measurements of one or more wheel speed sensors (not shown).

A filtering module 416 may apply a filter to the vehicle speed ROC 408 to generate a filtered vehicle speed ROC 420. For example only, the filtering module 416 may determine a moving average the vehicle speed ROC 408 over a predetermined period or apply another suitable type of filter to generate the filtered vehicle speed ROC 420. The predetermined period may be, for example, approximately 1 second or another suitable period. The moving average may be weighted or non-weighted.

A second period estimation module 424 generates a second estimated DFCO period 428 based on the vehicle speed ROC 408. The second estimated DFCO Period 428 may refer to an estimated period (e.g., seconds) from the present time that fuel could be cut off to the cylinders of the engine 102 before fueling to the cylinders would be re-enabled. In other words, the second estimated DFCO period 428 may refer to an estimated period of the next DFCO event.

The second period estimation module 424 may generate the second estimated DFCO period 428 using one of a function and a mapping that relates the filtered vehicle speed ROC 420 to the second estimated DFCO period 428. In various implementations, the second period estimation module 424 may generate the second estimated DFCO period 428 based on the vehicle speed ROC 408. In such implementations, the second period estimation module 424 may generate the second estimated DFCO period 428 using one of a function and a mapping that relates the vehicle speed ROC 408 to the second estimated DFCO period 428. For example only, second period estimation module 424 may generate the second estimated DFCO period 428 using the equation:

$$T_2 = \frac{\text{Vehicle Speed} - \text{Prev Vehicle Speed}}{\text{Filtered Vehicle Speed ROC}},$$

where $T_2$ is the second estimated DFCO period 428, Vehicle Speed is the vehicle speed 412 at the present sampling time, Prev Vehicle Speed is the vehicle speed 412 at the last sampling time, and Filtered Vehicle Speed ROC is the filtered vehicle speed ROC 420.

A DFCO disabling module 432 sets the TCM disable DFCO signal 364 to one of the active state and an inactive state at a given time based on the second estimated DFCO period 428. For example only, the DFCO disabling module 432 may set the TCM disable DFCO signal 364 to the active state when the second estimated DFCO period 428 is less than the predetermined minimum DFCO period. In this manner, the DFCO control module 348 will be disabled when the second estimated DFCO period 428 is less than the predetermined minimum DFCO period. Conversely, the DFCO disabling module 432 may set the TCM disable DFCO signal 364 to the inactive state when the second estimated DFCO period 428 is greater than the predetermined minimum DFCO period. In this manner, the DFCO control module 348 can be enabled when the second estimated DFCO period 428 is greater than the predetermined minimum DFCO period.

Figure 5:
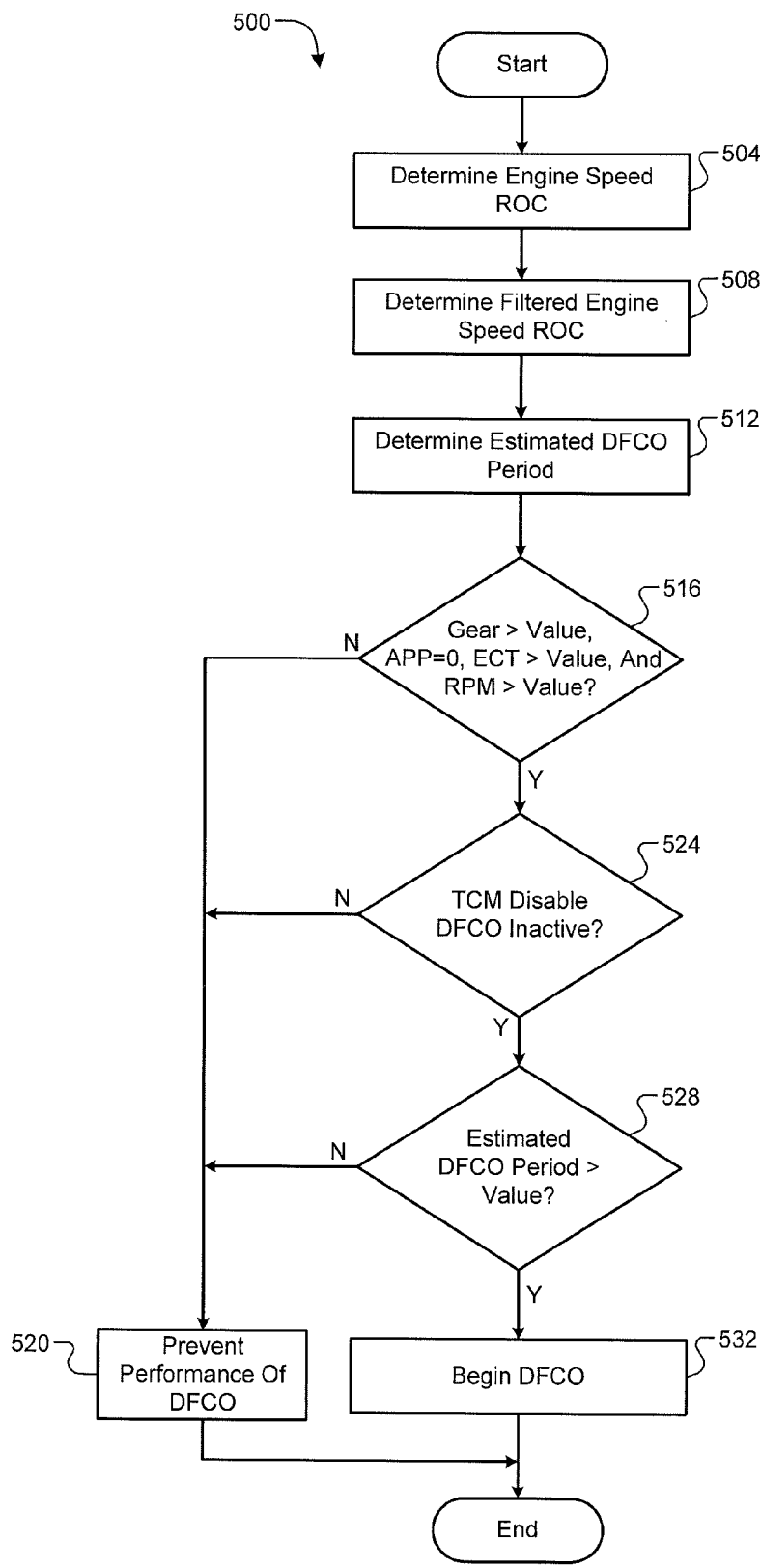
FIG. 5 includes a flowchart depicting an example method of controlling entry into DFCO according to the present disclosure.

Referring now to FIG. 5, a flowchart depicting an example method 500 of controlling DFCO is presented. Control may begin with 504 where control determines the engine speed ROC 320 based on the engine speed 224. Control determines the filtered engine speed ROC 328 at 508 based on the engine speed ROC 320.

Control determines the estimated DFCO period 336 at 512. Control may determine the estimated DFCO period 336 based on the filtered engine speed ROC 328, the engine speed 224, and the first predetermined engine speed. Control may generate the estimated DFCO period 336 using one of a function and a mapping that relates the filtered engine speed ROC 328, the engine speed 224, and the first predetermined engine speed to the estimated DFCO period 336. For example only, control may generate the estimated DFCO period 336 using the equation:

$$T = \frac{\text{Engine Speed} - \text{Pred Engine Speed}}{\text{Filtered Engine Speed } ROC},$$

where T is the estimated DFCO period 336, Engine Speed is the engine speed 224, Pred Engine Speed is the first predetermined engine speed, and Filtered Engine Speed ROC is the filtered engine speed ROC 328. In various implementations, the engine speed ROC 320 may be used in place of the filtered engine speed ROC 328.

At 516, control may determine whether the gear ratio 356 is greater than the predetermined ratio, the APP 352 is equal to the predetermined resting APP, the ECT 360 is greater than the predetermined temperature, and the engine speed 224 is greater than the second predetermined engine speed. If false, control may prevent a DFCO event (including cutting off fuel) from beginning at 520, and control may end. If true, control may continue with 524.

Control may determine whether the TCM disable DFCO signal 364 is in the inactive state at 524. If false, control may prevent a DFCO event from beginning at 520, and control may end. If true, control may continue with 528. At 528, control may determine whether the estimated DFCO period 336 is greater than the predetermined minimum DFCO period. If false, control may prevent a DFCO event from beginning at 520, and control may end. If true, control may initiate a DFCO event and cut off fuel to the engine 102 at 532, and control may end. While control is shown and discussed as ending, the method 500 may be illustrative of one control loop, and control may perform a control loop at predetermined intervals.

Figure 6:
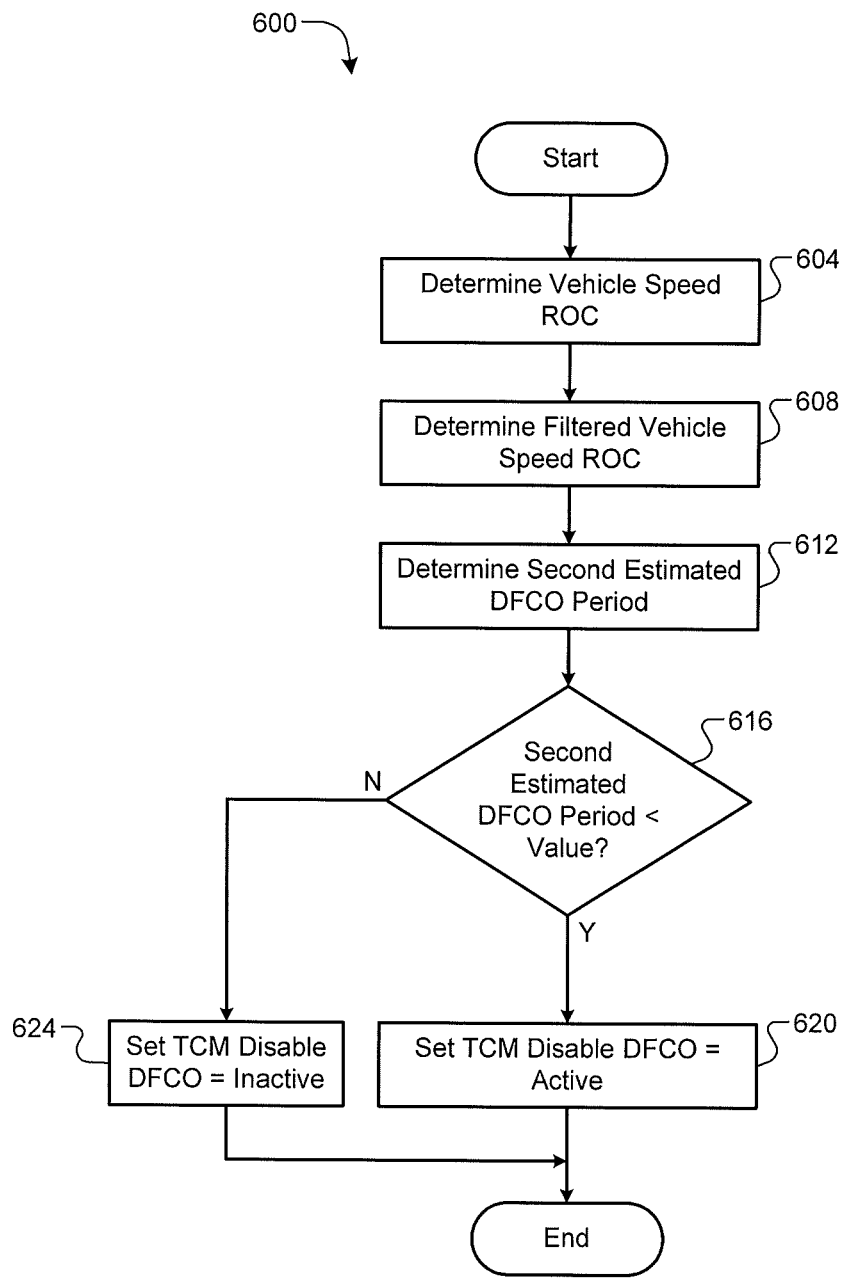
FIG. 6 includes a flowchart depicting an example method of enabling and disabling entry into DFCO according to the present disclosure.

Referring now to FIG. 6, a flowchart depicting an example method 600 of selectively disabling and allowing entry into DFCO is presented. Control may begin at 604 where control determines the vehicle speed ROC 408 based on the vehicle speed 412. Control may determine the filtered vehicle speed ROC 420 at 608. At 612, control determines the second estimated DFCO period 428. Control may determine the second estimated DFCO period 428 based on one of the filtered vehicle speed ROC 420 and the vehicle speed ROC 408. Control may determine the second estimated DFCO period 428 using one of a function and a mapping that relates the one of the filtered vehicle speed ROC 420 and the vehicle speed ROC 408 to the second estimated DFCO period 428.

At 616, control determines whether the second estimated DFCO period 428 is less than the predetermined minimum DFCO period. If true, control may set the TCM disable DFCO signal 364 to the active state at 620, and control may end. If false, control may set the TCM disable DFCO signal 364 to the inactive state at 624, and control may end. In this manner, control may prevent a DFCO event from beginning when the second estimated DFCO period 428 is less than the predetermined minimum DFCO period and allow fuel to be cut off for a DFCO event when the opposite is true. While control is shown and discussed as ending, the method 600 may be illustrative of one control loop, and control may perform a control loop at predetermined intervals.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for a vehicle, comprising:
   a rate of change module that determines a rate of change of an engine speed;
   a period estimation module that, while an engine is being fueled, determines an estimated period of a next deceleration fuel cutoff (DFCO) event based on the rate of change of the engine speed;
   a DFCO control module that selectively generates a DFCO signal based on the estimated period; and
   an injection control module that cuts off fuel to the engine when the DFCO signal is generated.

2. The system of claim 1 further comprising a filtering module that applies a filter to the rate of change of the engine speed to generate a filtered engine speed rate of change,
   wherein the period estimation module determines the estimated period based on the filtered engine speed rate of change.

3. The system of claim 2 wherein the period estimation module sets the estimated period of the next DFCO event equal to a speed difference divided by the filtered engine speed rate of change, and
   wherein the speed difference is equal to the engine speed minus a predetermined speed.

4. The system of claim 1 wherein the DFCO control module selectively generates the DFCO signal when the estimated period is greater than a predetermined period, and
   wherein the predetermined period is greater than zero.

5. The system of claim 4 further comprising an enabling/disabling module that disables the DFCO control module when a gear ratio engaged within a transmission is less than a predetermined gear ratio.

6. The system of claim 4 further comprising an enabling/disabling module that disables the DFCO control module when an accelerator pedal position is not equal to a predetermined resting accelerator pedal position.

7. The system of claim 4 further comprising an enabling/disabling module that disables the DFCO control module when a coolant temperature is less than a predetermined temperature.

8. The system of claim 4 further comprising an enabling/disabling module that disables the DFCO control module when the engine speed is less than a second predetermined speed.

9. The system of claim 4 further comprising:
a second rate of change module that determines a second rate of change of a vehicle speed;
a second period estimation module that, while the engine is being fueled, determines a second estimated period of the next DFCO event based on the second rate of change of the vehicle speed;
a DFCO enabling/disabling module that generates a disable DFCO signal when the second estimated period of the next DFCO event is less than the predetermined period; and
an enabling/disabling module that disables the DFCO control module when the disable DFCO signal is generated.

10. The system of claim 9 wherein the enabling/disabling module disables the DFCO control module when at least one of:
a gear ratio engaged within a transmission is less than a predetermined gear ratio;
an accelerator pedal position is not equal to a predetermined resting accelerator pedal position;
a coolant temperature is less than a predetermined temperature; and
the engine speed is less than a second predetermined speed.

11. A method for a vehicle, comprising:
determining a rate of change of an engine speed;
while an engine is being fueled, determining an estimated period of a next deceleration fuel cutoff (DFCO) event based on the rate of change of the engine speed; and
selectively generating a DFCO signal based on the estimated period; and
cutting off fuel to the engine when the DFCO signal is generated.

12. The method of claim 11 further comprising:
applying a filter to the rate of change of the engine speed to generate a filtered engine speed rate of change; and
determining the estimated period based on the filtered engine speed rate of change.

13. The method of claim 12 further comprising setting the estimated period of the next DFCO event equal to a speed difference divided by the filtered engine speed rate of change,
wherein the speed difference is equal to the engine speed minus a predetermined speed.

14. The method of claim 11 further comprising selectively generating the DFCO signal when the estimated period is greater than a predetermined period,
wherein the predetermined period is greater than zero.

15. The method of claim 14 further comprising preventing the generation of the DFCO signal when a gear ratio engaged within a transmission is less than a predetermined gear ratio.

16. The method of claim 14 further comprising preventing the generation of the DFCO signal when an accelerator pedal position is not equal to a predetermined resting accelerator pedal position.

17. The method of claim 14 further comprising preventing the generation of the DFCO signal when a coolant temperature is less than a predetermined temperature.

18. The method of claim 14 further comprising preventing the generation of the DFCO signal when the engine speed is less than a second predetermined speed.

19. The method of claim 14 further comprising:
determining a second rate of change of a vehicle speed;
while the engine is being fueled, determining a second estimated period of the next DFCO event based on the second rate of change of the vehicle speed;
generating a disable DFCO signal when the second estimated period of the next DFCO event is less than the predetermined period; and
preventing the generation of the DFCO signal when the disable DFCO signal is generated.

20. The method of claim 19 preventing the generation of the DFCO signal when at least one of:
a gear ratio engaged within a transmission is less than a predetermined gear ratio;
an accelerator pedal position is not equal to a predetermined resting accelerator pedal position;
a coolant temperature is less than a predetermined temperature; and
the engine speed is less than a second predetermined speed.

* * * * *

UNITED STATES PATENT AND TRADEMARK OFFICE
CERTIFICATE OF CORRECTION

| | | |
|---|---|---|
| PATENT NO. | : 9,127,603 B2 | Page 1 of 1 |
| APPLICATION NO. | : 13/358810 | |
| DATED | : September 8, 2015 | |
| INVENTOR(S) | : Ronald W. Knoebel et al. | |

It is certified that error appears in the above-identified patent and that said Letters Patent is hereby corrected as shown below:

Title Page, Item [73] Assignee, insert the following:

--GM Global Technology Operations LLC, Detroit, MI (US)--

Signed and Sealed this
Tenth Day of May, 2016

Michelle K. Lee
*Director of the United States Patent and Trademark Office*